United States Patent
Pettay

[11] 3,815,939
[45] June 11, 1974

[54] HITCH POSITIONER

[76] Inventor: Carol J. Pettay, 300 W. 16th St., Hutchinson, Kans. 67501

[22] Filed: Aug. 21, 1972

[21] Appl. No.: 282,445

[52] U.S. Cl.................. 280/474, 280/476, 280/432
[51] Int. Cl............................................. B62d 53/00
[58] Field of Search............ 280/474, 423 A, 446 B, 280/432; 172/450

[56] References Cited
UNITED STATES PATENTS

| | | | |
|---|---|---|---|
| 2,914,342 | 11/1959 | Silver et al. | 280/482 X |
| 3,078,930 | 2/1963 | Foote | 280/461 A X |
| 3,157,416 | 11/1964 | Sandbakken | 287/58 |
| 3,310,123 | 3/1967 | Abbott | 172/450 |
| 3,421,777 | 1/1969 | Barker et al. | 280/408 |
| 3,612,575 | 10/1971 | Stewart | 280/474 |
| 3,663,039 | 5/1972 | Morgan | 280/408 |

Primary Examiner—Leo Friaglia
Attorney, Agent, or Firm—John H. Widdowson

[57] ABSTRACT

Linkage connects between a leading trailer of a trailer truck rig having two trailers and a trailer supporting dolly hitched to the rear of the leading trailer. The linkage holds the dolly in a fixed horizontal position relative to the leading trailer. Two joined links connect between the rear of the leading trailer and the hitch end of the dolly.

6 Claims, 12 Drawing Figures

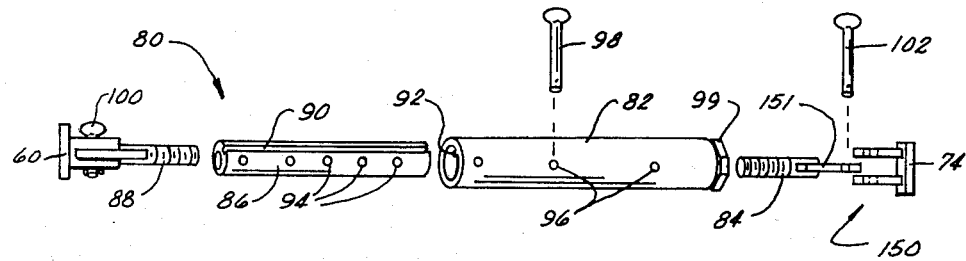

HITCH POSITIONER

Numerous types of trailer dolly structures are known in the prior art as being adapted to allow one trailer to be hitched to and pulled behind another trailer. In the prior art several types of these trailer dollies are known which are adapted to be attached to a pulling trailer in a rigid manner in order to prevent horizontal rotation of the dolly relative to the pulling trailer. Some of these prior art dollies are specially constructed to be rigidly attached to the rear of a pulling trailer and locked in position by various couplers, pins, etc.; and other dollies are constructed to be attached to the leading trailer by a hitch on the rear portion of the trailer, the dolly constructed with a pair of spaced plungers or the like on the sides of the dolly extendable from the dolly to contact the rear of the towing vehicle. These specially constructed trailer dollies have a disadvantage in that they are mechanically complicated in terms of the plungers, pins, and other coupling apparatus needed to rigidly secure the dolly to the pulling trailer or towing vehicle. The majority of such dollies now in use in the trucking industry to couple semi-trailer, multi-trailer trucks have no means to prevent horizontal rotation of the dolly about the attached hitch point on the rear of a pulling trailer or other towing vehicle. These popular and conventional styled dollies which are now in use are provided with a hitch on the forward end or tongue thereof which allows the dolly to freely pivot about a hitch point. The dolly has a trailer coupler above the axle which is engaged with the towed trailer the same as the coupler on a tractor. In the process of coupling one trailer to another, it is a time-consuming task requiring at least two people and a very skilled truck driver to back the tractor and the first attached trailer into position in front of the second trailer with the dolly attached to the rear of the first trailer. Due to the short tongue on the trailer dolly, it has a tendency to turn very quickly when moving in a rearward direction, thus requiring much skill on the part of the truck driver to control the position of the dolly when backing the truck and trailer so the dolly will properly align with the second or following trailer under which it is to be placed. The prior art dollies which rigidly position the dolly behind a towing vehicle or pulling trailer are constructed and adapted to prevent the turning motion of the dolly behind the trailer; however, these prior art dollies are structurally complicated, thus expensive to manufacture and maintain and are seldom used in the trucking industry for that reason. Additionally, the prior art dollies are not constructed so that they can be left in the rigidly connected arrangement when the truck is being moved in the forward direction as it would be used on the road.

The herein described hitch positioner of this invention includes a linkage apparatus to be used with semi-trailer truck vehicles having multiple trailers and is connectable between the rear of a leading trailer or towing vehicle and the hitch end portion of a towed trailer supporting dolly. The linkage apparatus when connected is adapted to hold the dolly in a fixed horizontal position relative to the leading trailer or towing vehicle. The hitch positioner includes a portion of the linkage apparatus pivotally securable to the rear of the trailer or towing vehicle in the area of the dolly hitch, and another linkage portion pivotally securable to the hitch end portion or tongue of the dolly structure, and a connector adapted in operation to rigidly connect the other link portions of the apparatus thereby fixing the length of the linkage apparatus and functioning in cooperation with the dolly hitch to hold the dolly in a fixed horizontal position relative to the leading trailer or towing vehicle. Several embodiments of the link structures, their mount structures, and the connector are disclosed herein. Each of the herein disclosed structural embodiments of the hitch positioner have the same functional elements, the difference in the various embodiments being in minor variations in the structure.

In one preferred specific embodiment, (1), of the hitch positioner of this invention, the structure includes a clevis type yoke and pin mount to connect the link apparatus to the dolly and to the rear of the towing vehicle. One link portion is threadedly engagable with the connector and the other link portion slidably engagable with the connector to be secured and positioned therewith by means of a pin passing through the connector and the link. The link that is threadedly attached to the connector is adapted to provide small adjustments in the overall length of the hitch positioner linkage apparatus. The link that is slidably engagable with the connector is adapted to provide large length adjustments for the hitch positioner linkage apparatus. In operation it provides a means of quickly shortening the hitch positioner for storage. The hitch positioner structure in all of the preferred specific embodiments is adapted to be disconnected from the towing vehicle and carried in a storage position on the dolly.

In a second preferred specific embodiment, (2), of the hitch positioner structure of this invention, such is provided with the same features as the first described preferred specific embodiment, (1), with a variation in the slidable link and connector. The slidable link and connector of this preferred specific embodiment, (2), are formed in a cross-sectional shape such as will not permit turning of the slidable link within the connector. In one variation, the slidable link member and connector are generally circular in cross section using a tongue and groove in the cooperating structures thereof to prevent rotation, the groove being in the link member and the protrusion or tongue being on the interior portion of the connector adapted to engage the link and hold it in position. In a second variation the shaped link and connector members are polygon shaped in cross-section, thus preventing rotation and allowing only sliding motion of the link within the connector.

In a third preferred specific embodiment, (3), of the hitch positioner of this invention, the structure is in the general form of a turnbuckle, wherein the connector is oppositely threaded on its end portions and the link members are threaded on their exterior so as to screw into the connector upon its rotation in one direction, and screw out of the connector upon its rotation in the opposite direction. The structure of this preferred specific embodiment also includes a plurality of pins passable through the connector at its end portions and also passable through the links so as to fix rotation of the connector relative to the links and in turn fix the overall length of the linkage structure.

In the several preferred specific embodiments of the hitch positioner structure of this invention, such is shown with several different structural mountings of the link which is attached to the pulling vehicle. The different structural mountings of the hitch positioner with the pulling vehicle are necessary since the rear of all trailers are not constructed the same. The slightly different mounting attachment for the appropriate connector link depends upon the structure of a particular towing trailer or vehicle involved. The several disclosed mountings of the towing vehicle link are intended to illustrate different means by which the hitch positioner can be mounted with structurally different trailers or other towing vehicles.

One object of this invention is to provide a hitch positioner structure overcoming the aforementioned disadvantages of the prior art devices.

Still, one other object of this invention is to provide a hitch positioner structure having a linkage structure securable between the rear of a towing vehicle and the hitch end portion of a trailer towing dolly which is adapted in operation to hold the dolly in a fixed horizontal position relative to the towing vehicle, the hitch positioner being easily connectable and disconnectable and in operation usable in backing the dolly for hitching purposes and other maneuvering and also being usable during normal road towing of the dolly with trailer attached.

Still another object of this invention is to provide a hitch positioner structure which is easily connectable between a trailer towing dolly and a towing vehicle, the hitch positioner structure having a linkage apparatus with links pivotally securable to the towing vehicle structure and the dolly structure and which are joinable by a connector to give the linkage structure a fixed length which in operation acts in cooperation with the dolly vehicle hitch to prevent rotation of the dolly vehicle in a horizontal direction relative to the towing vehicle.

Yet, one other object of this invention is to provide a hitch positioner structure which has a pair of links, one securable to the towing vehicle, the other pivotally securable to a trailer towing dolly and both of which are joinable by a connector, the connector being adapted to adjust the overall length of the combined linkage structure.

Yet, another object of this invention is to provide a hitch positioner which has a linkage structure that is connectable between the hitch portion of a towing vehicle and the hitch or tongue portion of a trailer towing dolly, the linkage structure being collapsible so as to be carried with the trailer towing dolly.

Still, another object of this invention is to provide a hitch positioner structure having a pair of linkage apparatuses, one adapted to mount on each side of the tongue of a trailer towing dolly, adapted in operation to be connected with the hitch portion of leading trailer or towing vehicle.

Various other objects, advantages, and features of the invention will become apparent to those skilled in the art from the following discussion, taken in conjunction with the accompanying drawings, in which:

FIG. 8 is an exploded perspective view of an embodiment of the hitch positioner structure, such having a specially shaped connector and link portion with a tongue and groove cross-section.

FIG. 9 is an exploded perspective view of an embodiment of the hitch positioner similar to that shown in FIG. 7 and having yoke type clevis ends on the mounting ends of the links;

FIG. 10 is an enlarged perspective view of the hitch portions of a towing vehicle and the trailer towing dolly, such having a specially shaped linkage apparatus connected therebetween with a rectangular cross-sectional shape, the towing vehicle having a recessed and open compartment therein a transverse structural member thereof to attach one end of the hitch positioner linkage;

Figure 1:
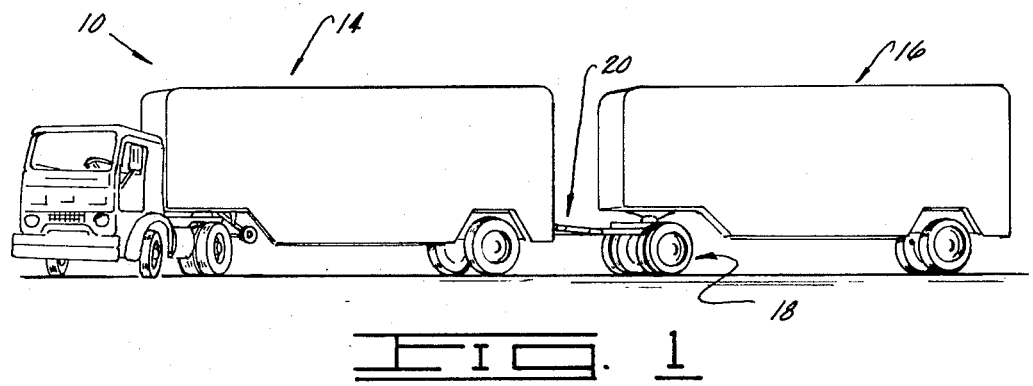
FIG. 1 is a perspective view of a semi-trailer truck having two trailers, one connected behind the other, the rear trailer being hitched to a trailer towing dolly and having the hitch positioner connected between the rear of the leading trailer and the attahced trailer towing dolly.

FIG. 11 is a perspective view of the hitch portion of a towing vehicle shown in dashed lines having a mount member on a longitudinal member thereof with a hitch positioner link attached to the mount; and FIG. 12 is a perspective view of a hitch portion of a towing vehicle shown in dashed lines having a mount member on a longitudinal member thereof with a hitch positioner link attached to the mount.

The following is a discussion and description of preferred specific embodiments of the hitch positioner structure of this invention, such being made with reference to the drawings, whereupon the same reference numerals are used to indicate the same or similar parts and/or structure. It is to be understood that such discussion and description is not to unduly limit the scope of the invention.

Figure 2:
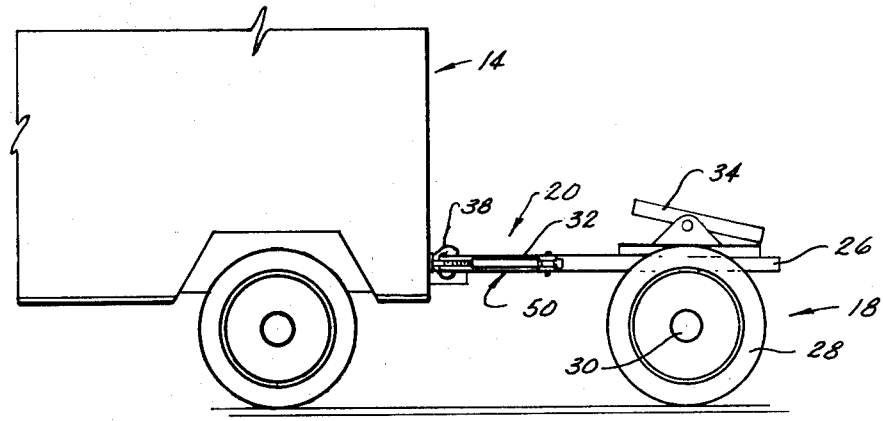
FIG. 2 is an enlarged side elevation view of the rear portion of a semi-trailer having a trailer towing dolly attached to the rear thereof at the hitch and having the hitch positioner connected between the trailer towing dolly and the rear of the semi-trailer.
Figure 3:
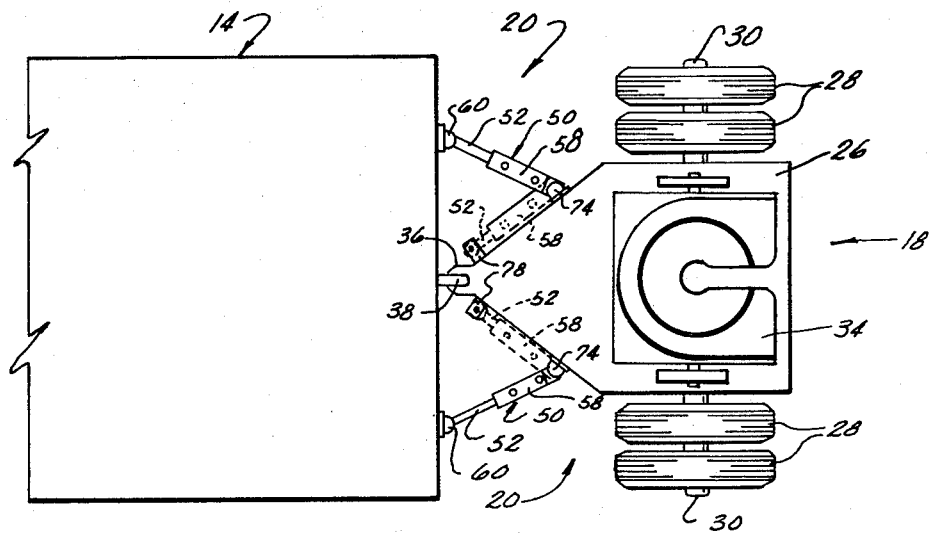
FIG. 3 is an enlarged top view of the semi-trailer and a trailer towing dolly shown in FIG. 2, with a pair of hitch positioners connected between the dolly tongue and the rear of the trailer, and showing in dashed lines the hitch positioners in a storage position.

Referring to the drawings in general and in particular to FIGS. 1, 2, and 3, a tractor trailer truck is shown having two trailers connected in line behind the tractor. The tractor 12 has a leading trailer connected immediately behind it, and a second trailer or a towed trailer 16 connected behind the leading trailer 14 by means of a trailer towing dolly 18. The tractor trailer truck vehicle 10 connected in this in line fashion is a popular and commonly used means of pulling two large trailers with a single tractor. The dolly apparatus 18 has a hitch adapted to mount the towed trailer 16 in the same manner as it would be mounted on the rear of the tractor 12. FIG. 2 and FIG. 3 show in more detail the trailer towing dolly 18 and its attachment to the leading trailer 14. The hitch positioner of this invention is generally indicated at 20 and is connected between the hitch portion of the trailer towing dolly 18 and the rear portion of the leading trailer 14. The hitch positioner 20 is adapted in operation to hold the trailer towing dolly 18 in a fixed horizontal position relative to the leading trailer 14. The hitch positioner 20 includes a linkage apparatus attached to the tongue portion of a trailer towing dolly 18 and attachable to the rear of the leading trailer 14. The hitch positioner 20 is constructed so as to allow it to be stored with the trailer towing dolly 18 when not in use.

Several preferred specific embodiments of the hitch positioner 20, of this invention, are disclosed herein which are variations of the basic apparatus apsects of the invention. One preferred specific embodiment, (1), is shown in detail in FIGS. 3, 4, 6, 11, and 12 and basically includes links mountable with the trailer towing dolly 18 and the leading trailer 14 which are joined by a connector; the connector has one link threadedly mounted with it and the other link slidably mounted and securable in fixed position by locking pins. Another preferrd specific embodiment, (2), of the invention is depicted in FIGS. 8 and 10, wherein the links and connector are shaped in a non-circular cross-section so as to prevent rotation of the connector rod due to the links. The links and connector are securable in the fixed position by locking pins. Another preferred specific embodiment, (3), of the invention is depicted in FIGS. 5, 7, and 9, wherein the links and connector are constructed in a turnbuckle fashion and lockable in a fixed position by means of locking pins.

Figure 6:
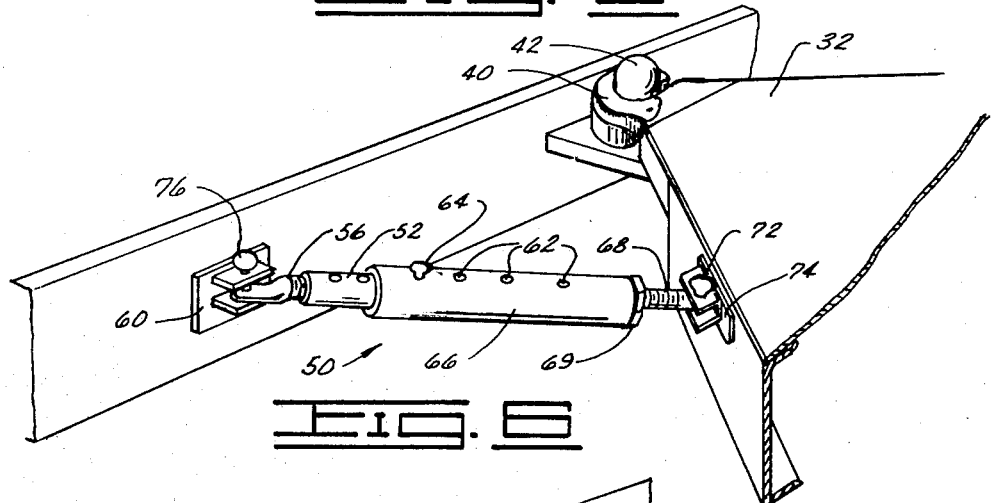
FIG. 6 is an enlarged perspective view of the hitch portions of a towing vehicle and the trailer towing dolly shown with the hitch positioner structure as shown in FIG. 4 connected therebetween.
Figure 7:
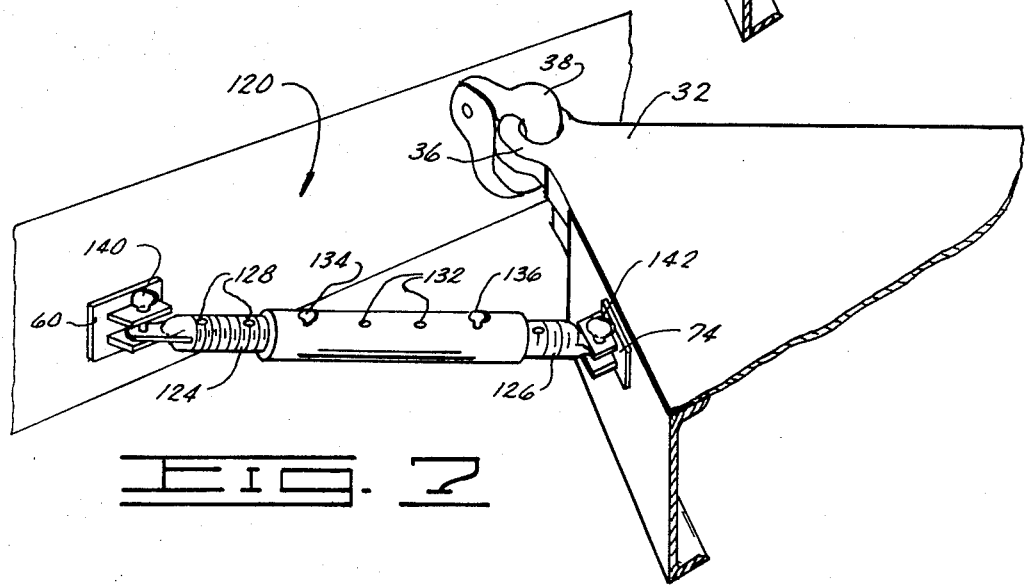
FIG. 7 is an enlarged perspective view of the hitch portions of a towing vehicle and the trailer towing dolly shown with the hitch positioner structure as shown in FIG. 5 connected between the dolly and the towing vehicle.

The trailer towing dolly structure is shown in detail in FIGS. 2, 3, 6, 7, and 10. The trailer towing dolly 18 includes a frame structure 26 supported above the ground by wheels 28 mounted with an axle 30, a tongue portion 32, and a hitch 34. The dolly frame 26 is generally supported above the axle 30 by means of springs, etc., so the hitch 34 is approximately the same height as the hitch of a truck tractor. The hitch 34 is the same type used on truck tractors to couple the semi-trailer to the tractor. The tongue portion 32 of the trailer towing dolly 18 extends from the main portion of the dolly structure forward and has a hitch 36 on the end thereof. The specific configuration of the dolly hitch 36 depends upon the manufacture of the dolly and the hitch to which it is to be attached; generally trailer towing dollies are provided with a ring as the hitch 36, such being easily attachable by a clamp type towing hitch or the like. The clamp type hitch 38 is shown in FIGS. 3 and 7 on the leading trailer vehicle 14 and is latched around the ring hitch 36 of the trailer towing dolly 18. Another dolly hitch is shown in FIGS. 6 and 10, wherein the dolly hitch is a hook 40 connectable around a pin 42 on the towing vehicle. The specific type of hitch on the trailer towing dolly 18 is not particularly significant relative to the hitch positioner 20 of this invention; the important feature of the dolly hitch is that it allows the trailer towing dolly 18 to rotate about a fixed point on a towing vehicle.

Figure 4:
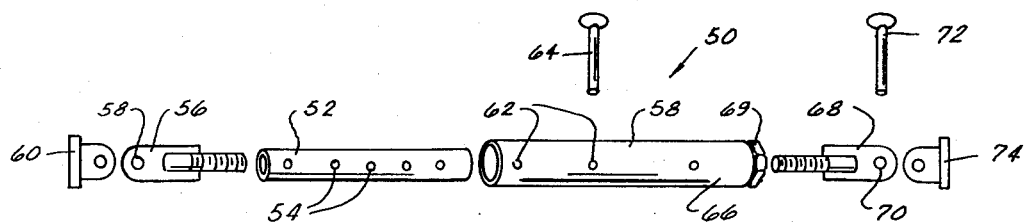
FIG. 4 is an exploded perspective view of an embodiment of the hitch positioner linkage structure with a cross-sectionally circular link and connector.
Figure 5:
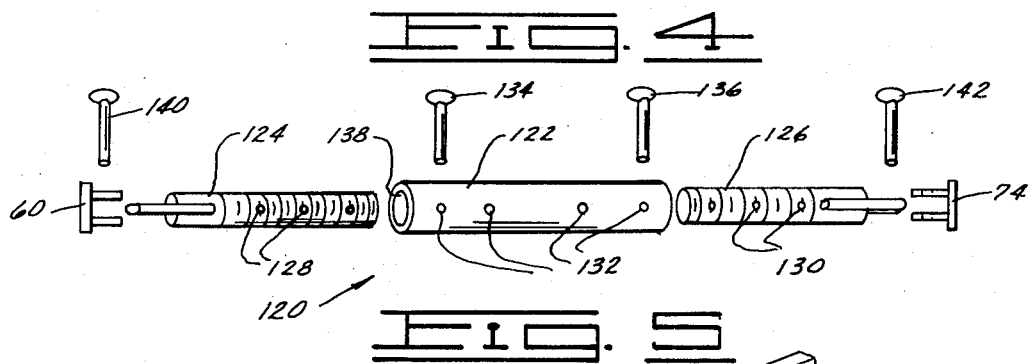
FIG. 5 is an exploded perspective view of an embodiment of the hitch positioner structure with the turnbuckle-like construction, such having threaded link portions and a threaded connector.

A preferred specific embodiment, (1), of the hitch positioner 20 of this invention is shown in detail in FIG. 4 and is shown in its connected position in FIGS. 3 and 6, with the hitch positioner linkage apparatus generally indicated at 50. The hitch positioner linkage includes generally two links mountable with a connector, one link slidably engagable with the connector and the other link threadedly engagable with the connector and the links being constructed to be attached to mounts on the trailer towing dolly and towing vehicle. Specifically, the hitch positioner 50 includes a slidable link 52 having a plurality of apertures 54 therethrough, and a link end 56 threadedly engagable with one end of the cylindrical portion 52. The end 56 has an aperture 58 therethrough its outer end adapted to receive a pin for connecting it with the mount 60. The connector 58 is an elongated cylindrical member with a plurality of apertures 62 therethrough adapted to receive a pin 64 for locking the link member 52 in place. The connector 58 is provided with a threaded end portion 66 adapted to mount a link end member 68. The link end member 68 is threaded on one end to engage the connector 58 and has an aperture 70 on the other end to receive a pin 72 used in securing it to the mount 74. A lock nut 69 secures the end member 68 to the connector 58. As shown in FIGS. 3 and 6 where the hitch positioner 50 is mounted, the mounts 60 and 74 are attached to the towing vehicle and the trailer towing dolly, respectively. The hitch positioner 50 is attached to the mounts 60 and 74 by pins 76 and 72, respectively.

In the actual installation of the hitch positioner 50 and other embodiments of the hitch positioner of this invention, they are preferably mounted generally as shown in FIG. 3, wherein the longitudinal axis of the hitch positioner is nearly perpendicular to the rear of the towing vehicle or leading trailer 14. The trailer and dolly apparatus shown in FIG. 3 utilize a hitch positioner 50 mounted on each side of the trailer towing dolly tongue 32. However, it is to be noted that due to the rigid length construction of the hitch positioner 20 generally, only one such hitch positioner linkage is necessary to maintain the trailer towing dolly 18 in a rigid position relative to the leading trailer 14 or towing vehicle. Two such hitch positioners are shown and may be used as a safety consideration, for if one of the hitch positioners failed, the other would still retain the trailer towing dolly 18 in the rigid horizontal position relative to the leading trailer 14 or other towing vehicle.

FIG. 3 shows the hitch positioner in the storage configuration. Storage of the hitch positioner 50 is accomplished by detaching the link end 56 from the leading trailer 14 or towing vehicle and attaching it to a lug 78 on the end portion of the trailer towing dolly tongue 32 after shortening the apparatus. The dashed lines in FIG. 3 indicate the position of the hitch positioner 50 in the storage position with the link end 56 attached to the lug 78. To mount the hitch positioner 20 with the trailer towing dolly 18 in the storage position, it is first necessary to detach the forward end thereof from the leading trailer 14 or towing vehicle, then shorten the overall length of the hitch positioner by removing the connector locking pins so that its overall length can be decreased. When this is done, the unattached end of the hitch positioner 20 is connected to the storage lug 78. When in the storage position, the connector locking pins need not be replaced; however, they should be kept safe for use at a later time. The storage mounting apparatus and storable features of the hitch positioner 20 are common to all the herein described preferred specific embodiments of the invention. The specific means of changing the length of the structure depends upon the specific embodiment thereof, however, done in the same general procedure and with the same overall effect.

Another preferred specific embodiment, (2), of the hitch positioner 20 of this invention is generally indicated at 80 and shown in FIGS. 8 and 10. The second embodiment hitch positioner 80 includes the same basic link elements and connector elements as the first described preferred specific embodiment, (1), with the exception that the slidable link portion and matching connector portion have a non-round cross-sectional shape so as to prevent rotation of the link within the connector. Two specific examples of non-round cross-sectional shaped connectors and links are shown and described herein, namely, a tongue and groove arrangement as shown in FIG. 8 and a polygon shaped arrangement as shown in FIG. 10. The second embodiment hitch positioner 80 includes a connector 82, one link end 84 threadedly attachable to the connector, slidable link portion 86 and a link end 88 threadedly attachable to the sliding link portion 86. The sliding link portion 86 and the link end 88 when connected form one portion of a linkage apparatus. The exterior of the slidable link 86 and the interior of the connector 82 are circular in cross-section with the exception of a longitudinal groove 90 in the link member 86 and a lug 92 extending from the interior wall of the connector 82. The lug or protrusion 92 is adapted to pass through the groove 90 as the sliding link 86 moves into and out of the connector 82, thus retaining the link end connector in the same relative circumferential position. A plurality of apertures 94 in the link member 86 are adapted to align with other apertures 96 in the connector member 82. A pin 98 is provided to pass through the connector apertures 96 and through the link apertures 94 to fix the longitudinal length of the hitch positioner in fixed position, and provide adjustments in large increments. The link ends 84 and 88 are rotatable in their respectively attached members and provide small adjustments in the length of the hitch positioner. A lock nut 99 is used to secure the link end 84 to the connector 82. Pins 100 and 102 are adapted to pass through apertures in the link ends 84 and 88, respectively, and attach the hitch positioner 80 to the mount lugs.

FIG. 10 shows another hitch positioner of the second preferred embodiment, (2), having a polygon cross-sectionally shaped connector and slidable link. The connector 106 and slidable link 108 as shown have a rectangular cross-section. The connector 106 is connected to a link end member 84 similar to the end member 84 shown in FIG. 8. The similar link ends 84 and 88 have the same numerals in FIG. 10 as in FIG. 8 because they are essentially the same and are attached to similar members in the same manner. The connector 106 has a plurality of apertures indicated at 110, and similarly the sliding link 108 has a plurality of apertures indicated at 112. The locking pin 98 is insertable through the apertures 110 and 112 to lock the connector 106 and sliding link 108 and provide large increments of adjustment for the hitch positioner similar to the structure shown in FIG. 8. The link ends 88 and 162 are preferably threadedly attached to the other link members 108 and 84, respectively. The only difference in the structures shown in FIG. 8 and FIG. 10 is the cross-sectional shape of the connector and the slidable link; in both cases they are non-circular in cross-sectional shape so as to prevent rotation of the connector member relative to the slidable link.

Another preferred specific embodiment, (3), of the hitch positioner 20 of this invention is shown in detail in FIGS. 5, 7, and 9; it is generally indicated at 120. This preferred specific embodiment of the hitch positioner 20 is a turnbuckle like hitch positioner 120 which has a connector member 122 with oppositely threaded internal end portions connecting oppositely threaded link members 124 and 126. The link end members 124 and 126 are threaded on the major portion thereof and through the threaded portions have apertures 128 and 130, respectively, for the receipt of locking pins. The connector 122 has a plurality of apertures 132 therethrough adapted to receive locking pins 134 and 136 to secure the link end members 124 and 126 in place. The interior of the connector 122 is indicated at 138 and is oppositely threaded on its end portions to receive the link end members 124 and 126 which are also oppositely threaded, one being threaded in the right-hand manner and the other being threaded in the left-hand manner. Rotation of the connector 122 in one direction is adapted to bring the link end members 124 and 126 closer together; and rotation in the opposite direction is adapted to move the link end members further apart, thereby changing the overall length of the hitch positioner. The outer ends of the link members 124 and 126 have a yoke-like construction and are provided with apertures to receive pins 140 and 142 to connect the hitch positioner with the mounting lugs.

Adjustment of the turnbuckle type hitch positioner 120 is easily done by removal of the locking pins 134 and 136 from the connector 122 and rotation of it relative to the link ends 124 and 126. Adjustment of the hitch positioner 120 can be done with the link ends 124 and 126 connected to the lugs or mounts. The locking pins 134 and 136 provide for fixing of the length of the hitch positioner in relatively large increments. The apertures through the connector link 122 are preferably placed in a staggered relation and likewise so are the apertures 128 and 130 through the link end members 124 and 126 so the locking pins may be passed through the connector 122 and either of the links 124 or 126 to provide adjustment of the hitch positioner 120 in convenient and often used positions. It is to be noted that only one of the locking pins 134 or 136 need be inserted to prevent rotation of the hitch positioner parts and prevent inadvertent changing of the hitch positioner's overall length.

In the heretofore described preferred specific embodiments of this invention, they have been shown and described as using a clevis-like mount with the links having a tongue-like outer end engagable with the clevis-like mount and held in place by a locking pin. It is to be understood that the construction of the mounts and the link ends can be other than that specific arrangement and still accomplish the same end result. A variation in the mounting structure of the hitch positioner is shown in detail in FIGS. 9, 11, and 12, wherein the U-shaped portion of the mount or clevis portion is on the link outer ends and the tongue is on the mount. A comparison of the structures shown in FIGS. 8 and 9 affords a clear representation of the mount variation. In FIG. 8 the clevis mount is generally indicated at 150 and includes a generally U-shaped or clevis member that is attachable to the trailer towing dolly structure or leading trailer 14 or towing vehicle structure, and a tongue-like member 151 on the end of the link member 84. In this arrangement the forks of the clevis have apertures and the end of the tongue 151 has an aperture which are adapted to receive the locking pin indicated at 102. In this arrangement the clevis mount, indicated at 74, is secured with a supporting structure as shown in FIGS. 6 and 7, and the link end tongue 151 can rotate in the mount about the locking pin when in the installed position. FIG. 9 shows a reverse clevis mount generally indicated as 152 wherein the U-shaped portion of the mount, indicated at 154, is on the end of the link end member, and the mount 156 has a single tongue 158 extending therefrom. This arrangement is physically opposite to the arrangement shown in FIG. 8. The yoke members 154 have apertures therethrough adapted to receive the locking pin 142, and likewise the mount tongue 158 has an aperture therethrough to receive the locking pin. The right-hand side of FIG. 9 shows in an exploded relation the reverse clevis mount 152, and the left-hand side of FIG. 9 shows the mount in the engaged and pinned position. FIGS. 11 and 12 show the reverse clevis mount 152 attached to structural portions of a leading trailer 14 or other towing vehicle. The reverse clevis mount 152 is shown as an alternative structural variation to the clevis mount 150 and is intended not to limit the scope of the herein disclosed invention.

Another alternative in mounting the hitch positioner 20 of this invention is the mounting shown in FIG. 10 and generally indicated at 160. The mounting arrangement 160 utilizes the mounting plate 156 and tongue 158 of the reverse clevis type mount 152 and a single tongue 162 on the end of the hitch positioner 80. The single tongue 162 is connected with the mount lug 158 by means of a locking pin wherein the tongue 162 is placed over the lug 158 and joined therewith by the locking pin. In this arrangement the mounting apparatus 160 is easily connected; however, it is somewhat weaker than the clevis mount 150 or the reverse clevis mount 152 since the locking pin is subjected only to single shear, whereas in the other mounting arrangements the locking pin is subjected to double shear. This alternate hitch position mounting 160 is not intended to limit the scope of the herein disclosed hitch positioner of this invention; it is intended to illustrate one way of coupling the hitch positioner links with the supporting structures.

In regard to mounting of the hitch positioner 20 with a towing vehicle or leading trailer, the specific mounting of it depends largely upon the structure of the rear of the towing vehicle, leading trailer, or whatever is pulling the trailer towing dolly 18. Different manufacturers of trailers and towing vehicles construct the vehicles generally similar, yet they are specifically structurally different, thus necessitating different mountings for the hitch positioner. Structural variations of the rear portion of trailers depends upon the intended use of the trailer and specifically whether or not it is to be used with a special unloading apparatus or used with a special or particular design of unloading dock or unloading ramp or whatever.

FIG. 10 illustrates the rear of a towing vehicle having a transverse beam 166 on the end thereof. The transverse beam 166 is shown in dashed lines for clarity. Some types of trailers use a beam like this on the rear thereof which is adapted to contact an automatic loading ramp or loading device when the truck backs up to and contacts a loading dock. In this instance the beam 166 must be flush against the loading dock or tripping mechanism in order for the loading ramp to be properly placed onto the bed of the trailer. A box structure 168 is shown in solid lines and constructed in the beam behind its outer face. The box 168 has the mounting plate 156 and lug 158 contained therein so that no portion of the mount extends outward past the outer surface of the beam 166. FIG. 10 shows the hitch positioner and trailer towing dolly attached to the towing vehicle, before the trailer on which the beam 166 is mounted is backed into position, the hitch positioner 80 and trailer towing dolly being removed. It is to be noted that the box structure 168 can be varied from that shown in the drawings; however, such must be constructed with the mounting lug or lugs contained within the structure and not extending beyond the rear surface of the beam 166.

FIG. 11 shows in dashed lines the rear structure of a towing vehicle having a transverse member 170 and a longitudinal member 172. The mounting block 156 is attached to the extreme end of the longitudinal member 172 and is on the outer end of the vehicle. The hitch positioner 20 is connectable to the mounting lug 158 on the mounting plate 154 by means of the clevis yoke 154 as shown. The physical arrangement of the longitudinal member 172 and the transverse member 170 as shown is with the end of the longitudinal member extending rearward past the transverse member 170; this is subject to variation depending upon the particular towing vehicle; however, it is characteristic of a number of such vehicles. Other vehicles may have the transverse member positioned forward relative to the end of the longitudinal member 172; however, such is a minor variation of the basic structure.

FIG. 12 shows yet another rear portion of the towing vehicle, in dashed lines, having a transverse member 176 and longitudinal member 178 wherein the longitudinal member 178 is above and extends rearward past the transverse member 176. In this instance the towing vehicle has a pair of longitudinal members 178; this arrangement requires the mounting plate 156 to be attached on the inner portion of such members with the lug 158 extending inward or toward the center of the vehicle. The physical arrangement of the structure with the longitudinal member 178 extending past the transverse member 176 is of relatively minor significance. The important feature of this mounting is that the mounting plates 56 are attached to the interior portion of a longitudinal structural member on a towing vehicle.

In the use and operation of the hitch positioner 20 of this invention, it is normally connected between the rear of a leading trailer 14 and the tongue portion 32 of a trailer towing dolly 18 as shown in FIGS. 1, 2, and 3. With the trailer towing dolly 18 having its hitch 36 connected with the hitch 38 on the rear of the leading trailer 14, then one or two of the hitch positioners can be connected between the trailer towing dolly 18 and the towing vehicle. In order to align the trailer towing dolly 18 directly behind the towing vehicle, the towing vehicle must first be moved in a forward direction in a straight line so the dolly will align itself directly behind the attached vehicle. When the dolly 18 is properly aligned, the hitch positioner 20 can be released from the storage position and connected with the mounts on the rear of the towing vehicle so that the hitch positioner assumes the position shown in FIG. 3. Once the hitch positioner 20 is in the proper position, locking pins can be inserted through the connector fixing the length of the hitch positioner. Depending upon the particular embodiment hitch positioner used, the minor adjustments in length of the hitch positioner 20 can be done by the threaded link end members or rotation of the connector in order to position the apertures of the mounts and the link ends so the mounting pins and connector locking pins can be inserted. If two hitch positioners are desired to be connected, the same procedure is used for adjusting and connecting both of them. When one or both of the hitch positioners are attached to the trailer towing dolly and the rear of the towing vehicle, the dolly 18 will be held in a substantially rigid horizontal position relative to the towing vehicle, and the connection of the mounts and the hitches will allow the dolly to move vertically in the normal manner as required by the wheels of the towing vehicle and trailer towing dolly moving over an uneven terrain.

With the hitch positioner 20 connected between the towing vehicle and the trailer towing dolly 18, the dolly will remain directly behind the towing vehicle, thereby allowing the towing vehicle to be backed easily without regard for the trailer towing dolly 18. When connecting a towed trailer 16 to the towing vehicle connected with the trailer towing dolly 18, the leading trailer 14 or other towing vehicle can be easily backed into position so as to place the trailer towing dolly 18 and particularly its hitch 34 under the front portion of a towed trailer as shown in FIG. 1. It has been found in practice that the hitching operation of a towed trailer 16 to a leading trailer 14 takes one person only a few moments to accomplish whereas before, without the use of the hitch positioner 20 of this invention, such required two people and sometimes a great deal of time depending upon the skill of the truck driver in backing the tractor 12, the leading trailer 14, and the trailer towing dolly 18. The hitch positioner 20 of this invention can be disconnected once the trailer towing dolly 18 is connected with the towed trailer 16, or in some cases it can be left in the connected condition while on the road. In practice it has been found advantageous to leave the hitch positioner 20 of this invention connected when a multiple trailer, semi-trailer truck is on the highway and is driving in a cross wind condition. Normally with a cross wind condition the second trailer is whipped considerably from side to side since the dolly 18 being pulled from side to side and turned by the transverse translating movement of the rear of the leading trailer to which it is attached. With the hitch positioner connected and driving on the road in a cross wind condition, it has been found that the amount of whipping resultant to the towed trailer 16 is considerably reduced due to the trailer towing dolly's rigid horizontal connection with the leading trailer 14.

In the manufacture of the hitch positioner structure of this invention, it is obvious that the structure can be easily constructed by common fabricating techniques in order to achieve the end product. The hitch positioner structure of this invention can be constructed relatively lightweight if two of the hitch positioners are to be used since one of the hitch positioners will be operating in tension and one in compression under the forces normally causing rotation of the trailer towing dolly 18. The several disclosed embodiment of the hitch positioner 20 are relatively simple structurally and can be manufactured without the need for complicated or extremely precise manufacturing equipment.

In the use and operation of the hitch positioner structure of this invention, it is seen that same provides a means to couple a towing vehicle and an attached trailer towing dolly such that horizontal rotation of the trailer towing dolly about the towing vehicle is prohibited. The use of the hitch positioner structure of this invention is intended to prevent rotation of a trailer towing dolly about the rear of a towing trailer of a multi-trailer, semi-trailer truck so as to provide an easy means of connecting the trailer towing dolly with a towed trailer. In the actual use of the hitch positioner of this invention, it has been found in practice to considerably reduce the time and effort required to couple the trailer towing dolly with a towed trailer. Additionally, the hitch positioner of this invention in practice has been found useful to prevent undue whipping of a towed trailer of a multi-trailer semitrailer truck when being pulled on the road and in particular when towed in a cross wind condition. The hitch positioner of this invention is constructed so that it can be detached easily from the towing vehicle and carried with a trailer towing dolly 18 in a storage position to be connected when needed.

As will become apparent from the foregoing description of the applicant's hitch positioner structure, relatively inexpensive and simple means have been provided to position a trailer towing dolly behind a towing vehicle so that it will maintain a fixed horizontal position. The hitch positioner structure is economical to manufacture, simple to use, storable on the trailer towing dolly and easily connectable with a towing vehicle when needed.

While the invention has been described in conjunction with preferred specific embodiments thereof, it will be understood that this description is intended to illustrate and not limit the scope of the invention, which is defined by the following claims.

I claim:

1. A hitch positioner, comprising:
 a. a first link means having in an outer end portion means to attach same to a dolly vehicle at the hitch end portion thereof, said dolly vehicle having means to hitch same to a towing vehicle and means to mount for towing another trailer,
 b. a second link means having means in an outer end portion to attach same to said towing vehicle at the rear portion thereof,
 c. a means to rigidly secure together said first link means and said second link means, said first link means and said second link means are each pivotally attachable to the dolly vehicle and the towing vehicle respectively, said means to rigidly secure is a connector link means, said connector link means has means to secure said first link means and said second link means thereto, said first link means and said second link means have a pivotal mount means secured to the structure of said dolly vehicle and the towing vehicle respectively, said first link means and said second link means each have an outer end portion with a lug thereon, said lug being constructed and adapted to be attached to said mount means, said first link means and said second link means each have an inner end portion on the end portion thereof opposite said outer end portion, said connector link means has means to receive and hold said first link means and said second link means on an inner end portion thereof, said connector link means is an elongated member having a cylindrical interior portion and a transverse aperture therethrough, and said inner end portion of said second link means is an elongated cylindrical portion and has a transverse aperture therethrough, same said inner end portion passable into said cylindrical interior portion of said connector link means, said hitch positioner is constructed and adapted in operation to be connected when the dolly vehicle is hitched to said towing vehicle in order to maintain the dolly vehicle in a rigid horizontal position relative to said towing vehicle.

2. The hitch positioner of claim 1, wherein:
a. said first link means inner end portion is threadedly attached to said connector link means,
b. said means to secure is a locking pin passable through said connector aperture and said second link means aperture, and
c. said first link means lug, said second link means lug and said mount means have apertures therethrough constructed and adapted in operation to receive a locking pin.

3. The hitch positioner of claim 2, wherein:
a. said second link means inner end portion has a plurality of said transverse apertures therethrough, and
b. said connector link means has a plurality of said transverse apertures therethrough.

4. In a rig having a tractor, a leading trailer hitched to the tractor, and a dolly vehicle hitched to the rear of the leading trailer, said dolly vehicle having means hitching same to said leading trailer and mounting for towing a semi-trailer, a hitch positioner, comprising in combination:
a. a first link means having in an outer end portion a means to attach to said dolly on the hitched end portion thereof,
b. a second link means having in an outer end portion a means to attach same to said leading trailer on the rear thereof, and
c. a means to rigidly secure together said first link means and said second link means, said first link means and said second link means are each pivotally attachable to the dolly vehicle and the leading trailer respectively, said means to rigidly secure is a connector link means, said connector link means has means to secure said first link means and said second link means thereto, said first link means and said second link means have a pivotal mount means secured to the structure of said dolly vehicle and the leading trailer respectively, said first link means and said second link means each have an outer end portion with a lug thereon, said lug being constructed and adapted to be attached to said mount means, said first link means and said second link means each have an inner end portion on the end portion thereof opposite said outer end portion, said connector link means has means to receive and hold said first link means and said second link means on an inner end portion thereof, said connector link means is an elongated member having a cylindrical interior portion and a transverse aperture therethrough, and said inner end portion of said second link means is an elongated cylindrical portion and has a transverse aperture therethrough, same said inner end portion passable into said cylindrical interior portion of said connector link means, said hitch positioner is constructed and adapted in operation to be connected when the dolly vehicle is hitched to said leading trailer in order to maintain the dolly vehicle in a rigid horizontal position relative to said leading trailer.

5. The hitch positioner of claim 4, wherein:
a. said first link means inner end portion is threadedly attached said connector link means,
b. said means to secure is a locking pin passable through said connector aperture and said second link means aperture, and
c. said first link means lug, said second link means lug and said mount means have apertures therethrough constructed and adapted in operation to receive a locking pin.

6. The hitch positioner of claim 5, wherein:
a. said second link means inner end portion has a plurality of said transverse apertures therethrough, and
b. said connector link means has a plurality of said transverse apertures therethrough.

* * * * *